Dec. 9, 1952  F. S. JONES  2,620,589
ANIMAL TRAP
Filed July 15, 1949  2 SHEETS—SHEET 1

F. S. Jones
INVENTOR
BY C.A.Snow&Co.
ATTORNEYS.

Dec. 9, 1952　　　　　　　F. S. JONES　　　　　　2,620,589
ANIMAL TRAP
Filed July 15, 1949　　　　　　　　　　　　2 SHEETS—SHEET 2
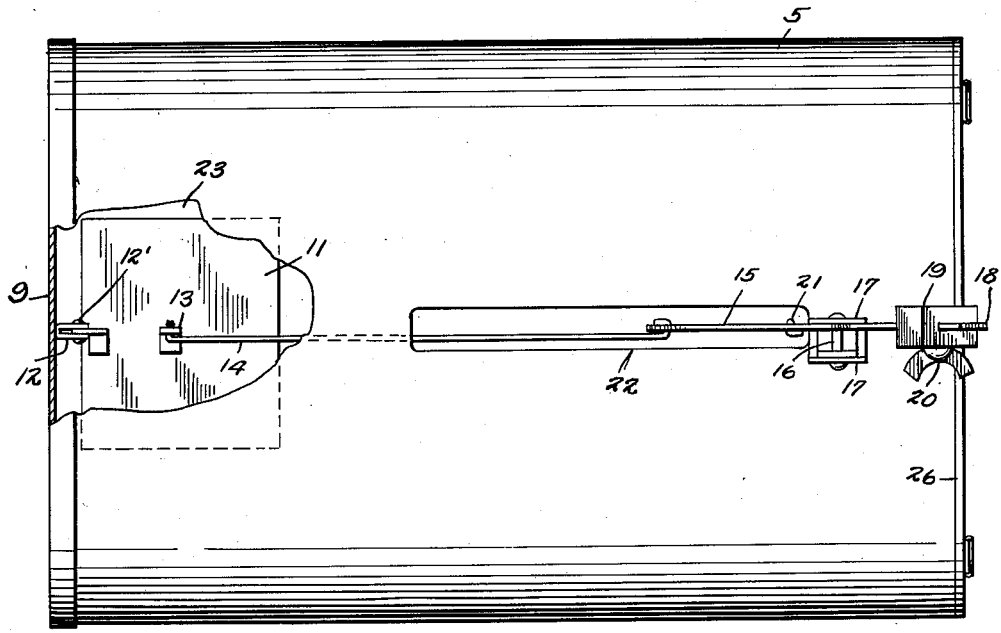
Fig. 2.
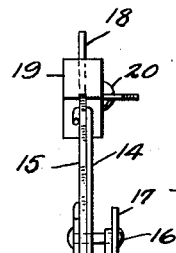
Fig. 3.
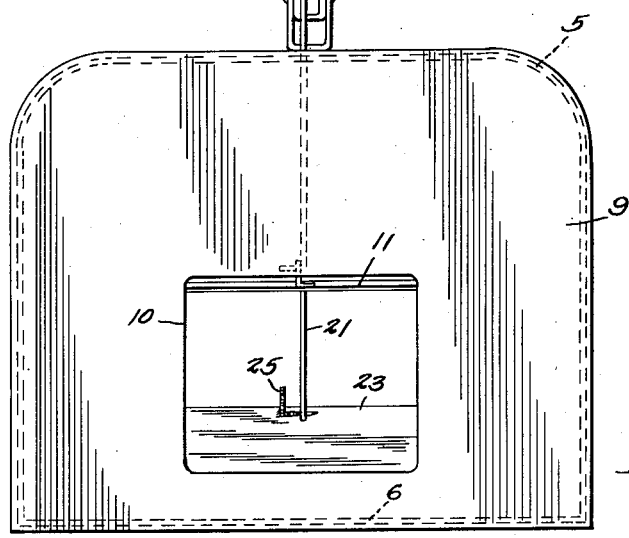
F. S. Jones
INVENTOR
BY C. A. Snow & Co.
ATTORNEYS.

Patented Dec. 9, 1952

2,620,589

UNITED STATES PATENT OFFICE 2,620,589

ANIMAL TRAP

Floyd S. Jones, Durham, N. C.

Application July 15, 1949, Serial No. 104,881

1 Claim. (Cl. 43—61)

This invention relates to animal trap construction, the primary object of the invention being to provide an animal trap which will be automatically closed under the weight of the animal entering the trap, the trap remaining in its closed position trapping the animal therein, until the animal is removed.

An important object of the invention is to provide a trap of this character which may be set for operation under the weight of one or more animals, so that one or more animals may be caught in the trap with each setting of the trap.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Fig. 2 is a plan view thereof, a portion of the top of the trap being broken away, illustrating the closure of the trap.

Fig. 3 is a front elevational view of the trap.

Figure 1:
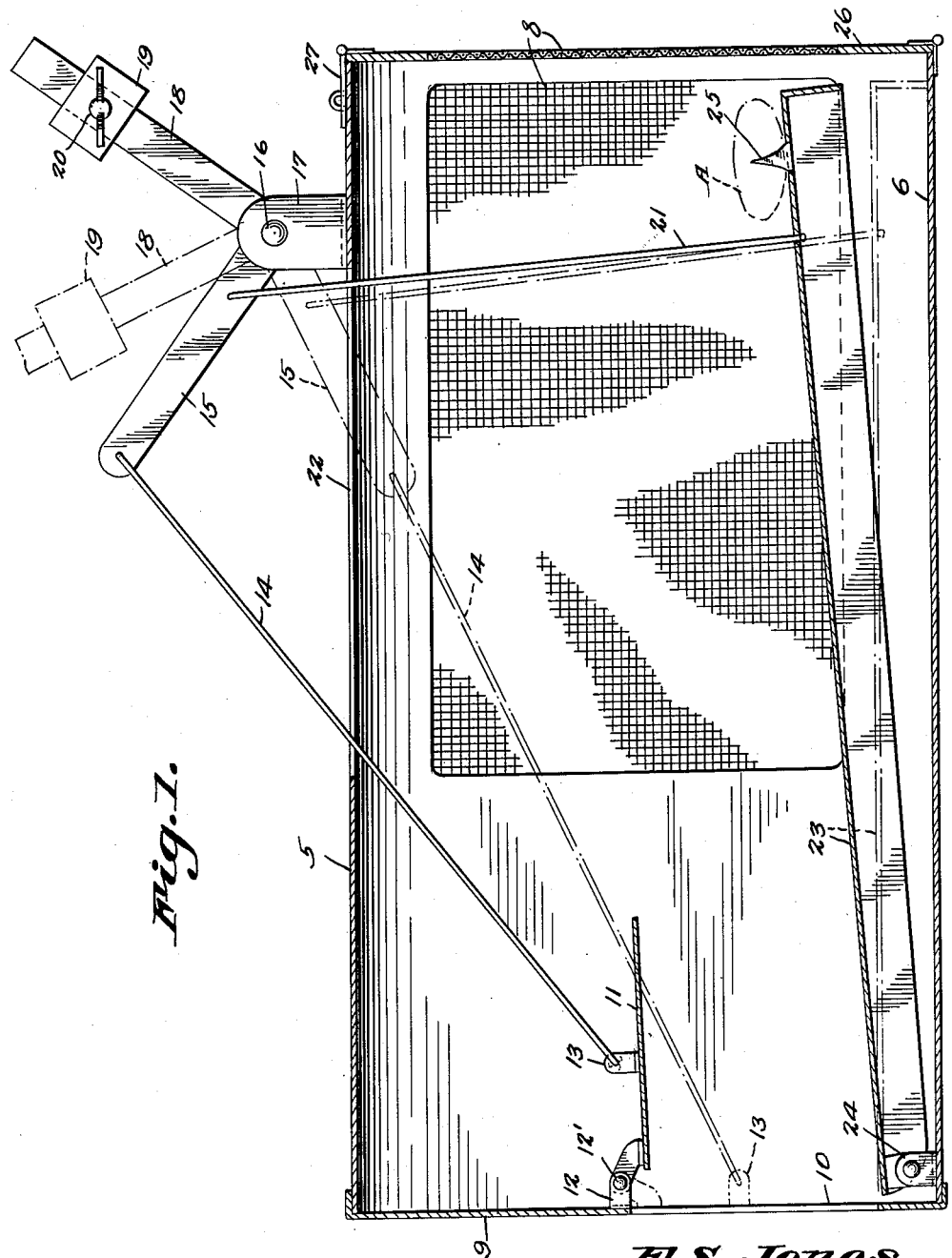
Figure 1 is a longitudinal sectional view through an animal trap constructed in accordance with the invention.

Referring to the drawings in detail, the cage or body portion is indicated generally by the reference character 5, and as shown, comprises a base 6 and preferably a length of sheet metal material curved to provide the top and sides of the cage or body portion.

Portions of the cage are cut away providing openings which are closed by the wire mesh material 8 so that animals caught within the trap, may be viewed through the wire mesh material, and the odors from the bait in the trap, may escape, to attract the animals.

The front wall of the trap is indicated by the reference character 9 and is provided with an entrance opening 10 which is normally closed by means of the closure 11 which swings downwardly from arm 12 on the hinge 12', to close the opening.

Extending inwardly from the closure 11, is an ear 13 to which the rod 14 is connected, the rod 14 being also connected to the outer end of the arm 15 forming a part of the bell crank lever which in turn is pivotally mounted on the bolt 16 that passes through aligning openings in the ears 17 that rise from the top of the body portion.

The arm 18 of the bell crank lever, provides a support for the adjustable weight 19 which is slidable longitudinally of the arm 18, and held in place by means of the wing nut 20, and since the bell crank lever is supported in such a way that the arms 15 and 18 thereof are extended upwardly, it will be obvious that by adjusting the weight 19, the operation of the bell crank lever may be controlled.

Connected with the arm 15 of the bell crank lever, is the rod 21 which extends downwardly through the slot 22 in the top of the body portion, where it connects with the pivoted platform 23, the pivoted platform 23 being mounted on the ears 24, disposed adjacent to the bottom of the entrance opening 10 of the body portion.

At the inner end of the platform, is a bait prong 25 on which the bait is positioned and held, the bait in the present showing being indicated by the reference character A.

The reference character 26 indicates the hinged closure that closes the rear end of the body portion, the closure 26 being held in its closed position by means of the hasp 27.

From the foregoing it will be seen that due to the construction shown and described, when the trap has been set for operation under the weight of a single animal, the animal walking through the opening 10, will cause the platform 23 to swing downwardly under the weight of the animal, with the result that the rod 21 moves downwardly moving the arm 15 and rod 14, closing the opening 10. As long as the animal remains in the cage, it will be obvious that the door will be retained closed.

By adjusting the weight 19, the platform may be regulated to move under the weight of two or more animals, to suit the requirements of the person operating the trap. If the trap has been set for operation under the weight of one animal, its is obvious that this animal may pass into and out of the trap freely without operating the trap to close the closure 11. When two animals attempt to remove the bait from the prong, the weight of two animals on the platform will cause the platform to swing downwardly, operating the closure.

When it is desired to remove the trapped animals, the animals may be removed through the hinged closure 26 which is sufficiently large to permit the person using the trap to insert his hand in the trap and catch the animal which may then be removed.

The hinged closure 26 also affords means whereby the trap may be readily baited.

Having thus described the invention, what is claimed is:

An animal trap comprising a cage having an entrance opening at one end thereof, a platform, pivotal means for connecting the front end of the platform within the cage at the entrance opening thereof, the opposite end of the platform extending to a point adjacent to the rear end of the cage, a closure pivotally mounted above the entrance opening adapted to swing downwardly closing said opening, a bell-crank lever mounted on the top of the cage adjacent to the rear end thereof, a rod connecting the pivoted closure and outer end of one arm of the bell-crank lever, a rod connecting the rear end of the platform with said arm of the bell-crank lever at a point adjacent to the pivot point of said arm, whereby movement of said arm moves the closure and platform simultaneously, a weight adjustably mounted on the other arm of the bell-crank lever balancing said bell-crank lever, temporarily holding the closure in either an open or closed position.

FLOYD S. JONES.

REFERENCES CITED

The following references are of record in the file of this patent:

UNITED STATES PATENTS

| Number | Name | Date |
| --- | --- | --- |
| 621 | Kell | Mar. 3, 1838 |
| 1,131,124 | Dodson | Mar. 9, 1915 |
| 1,451,223 | Howard | Apr. 10, 1923 |
| 2,156,213 | White | Apr. 25, 1939 |